United States Patent
Chen et al.

(10) Patent No.: US 8,508,138 B2
(45) Date of Patent: Aug. 13, 2013

(54) LIGHTING SYSTEM FOR DIM AMBIENCE

(75) Inventors: Yuan-Ching Chen, Kaohsiung (TW); Hsueh-Chih Chang, Changhua County (TW); Hung-Lieh Hu, Hsinchu (TW); Hsiang-Chi Chung, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 243 days.

(21) Appl. No.: 13/037,390

(22) Filed: Mar. 1, 2011

(65) Prior Publication Data

US 2012/0169239 A1 Jul. 5, 2012

(30) Foreign Application Priority Data

Dec. 31, 2010 (TW) ................................ 99147332 A (51) Int. Cl.
H05B 37/02 (2006.01)
(52) U.S. Cl.
USPC ............................ 315/152; 315/307; 315/312
(58) Field of Classification Search
USPC ................. 315/149–159, 291, 307–308, 312; 345/589, 690
See application file for complete search history.

(56) References Cited

U.S. PATENT DOCUMENTS

| | | | |
|---|---|---|---|
| 4,277,728 A * | 7/1981 | Stevens | 315/307 |
| 6,325,530 B1 | 12/2001 | Bernazzani et al. | |
| 7,258,438 B2 | 8/2007 | Van Derlofske et al. | |
| 7,628,508 B2 | 12/2009 | Kita et al. | |
| 2011/0031890 A1 * | 2/2011 | Stack | 315/228 |
| 2011/0175925 A1 * | 7/2011 | Kane et al. | 345/589 |
| 2012/0044274 A1 * | 2/2012 | Lee et al. | 345/690 |

FOREIGN PATENT DOCUMENTS

JP 2009-254479 11/2009

OTHER PUBLICATIONS

Fies et al., "A proposed unified system of photometry", Lighting Res. Technol. 36,2, (2004) pp. 85-111.
Derlofske et al., "Design and optimization of a retinal flux density meter", Meas. Sci. Technol. 13 (2002), pp. 821-828.
He et al., "Evaluating Light Source Efficacy Under Mesopic Conditions Using Reaction Times", Journal of the Illuminating Engineering Society, Winter 1997, pp. 125-138.
Rea et al., "Outdoor Lighting: Visual Efficacy", vol. 6, Issue 2, A publication of the Alliance for Solid-State Illumination System and Technologies, Jan. 2009, pp. 1-14.
Derlofske et al., "Spectral Effects of LED Forward Lighting", A Transportation Lighting Alliance Report, TLA 2005-02, Apr. 2005, pp. 1-19.

* cited by examiner

Primary Examiner — Tung X Le
(74) Attorney, Agent, or Firm — Jianq Chyun IP Office (57) ABSTRACT

A lighting system for dim ambience has at least one light source module, implemented in an ambience. The light source module has multiple light emitting units. Each unit is respectively controlled to produce a luminance. A luminance detecting unit detects a photonic luminance and a luminance ratio. A processing and operation module calculates a mesopic luminance according to the photonic luminance and the luminance ratio. When the photonic luminance is less than a dim-light setting value, a power control information is obtained by a fitness operation with a given condition set. The power control information is corresponding to an optimized mesopic luminance after fitness. A control unit receives the power control information to modulate the luminance of the light emitting units.

18 Claims, 8 Drawing Sheets

LIGHTING SYSTEM FOR DIM AMBIENCE

CROSS-REFERENCE TO RELATED APPLICATION

This application claims the priority benefit of Taiwan application serial no. 99147332, filed on Dec. 31, 2010. The entirety of the above-mentioned patent application is hereby incorporated by reference herein and made a part of this specification.

TECHNICAL FIELD

The disclosure relates to the illuminating technology. More particularly, the disclosure relates to an illuminating technology under a dim ambience.

BACKGROUND

Illuminating apparatus is usually used to provide the illuminating effect in the dark ambience. However, the luminance of illuminating apparatus is usually fixed with a constant illuminating intensity. In other words, when the illuminating apparatus is turned on, the power consumption usually remains the same. Although some of the illuminating apparatuses allow to change the luminance by adjusting the duty cycle to adapt the brightness in the ambience, it is not adjusted according to the visual effect of human eyes. As usually known, the luminance efficacy of human eyes at the photopic state and the scotopic state have different response curves with respect to the wavelength. When the ambience is at dim state, the response of eye with respect to wavelength is based on the curve of mesopic state. Therefore, the proper luminance needs to be adjusted according to the response curve of human eyes at the mesopic state.

How to automatically adjust the luminance of lighting source is an issue under consideration when designing the light source.

SUMMARY

The disclosure provides a lighting system for dim ambience, capable of automatically adjusting the luminance of the lighting apparatus based on the luminance of ambience with the visual efficacy of human eye at the mesopic state.

In an embodiment of the disclosure, a lighting system for dim ambience is provided, including at least one light source module, a luminance detecting unit, a processing and operation module and a control unit. The light source module is implemented in an ambience to provide luminance, wherein each of the light source module has a plurality of light emitting units. Each light emitting unit is respectively controlled to generate a luminance. The luminance detecting unit detects a photopic luminance (P) and a luminance ratio (S/P) of the ambience. The luminance ratio (S/P) is defined by a ratio of a scotopic luminance (S) to the photopic luminance (P). The processing and operation module calculates a mesopic luminance according to the photopic luminance and the luminance ratio. When the photopic luminance is less than a dim-light setting value, a power control information is obtained by a fitness operation with a given condition set. The power control information is corresponding to an optimized mesopic luminance after the fitness operation. The given condition set is composed by referencing to a mesopic luminance parameter, a photopic luminance parameter, and a power parameter. The control unit receives the power control information to adjust the luminance of the light emitting units.

In an embodiment of the disclosure, a lighting system for dim light is provided including at least one light source module, a luminance detecting unit, a processing and operation module and a control unit. The light source module is implemented in an ambience to provide luminance, wherein each of the light source module has a plurality of light emitting units. Each light emitting unit is respectively controlled to generate a luminance. The luminance detecting unit detects a photopic luminance (P) of the ambience. The processing and operation unit externally receives a light source information of the light source module to calculate out a luminance ratio (S/P), which is defined by a ratio of a scotopic luminance (S) to the photopic luminance (P). In addition, a mesopic luminance is calculated out according to the photopic luminance and the luminance ratio. When the photopic luminance is less than a dim-light setting value, a power control information is obtained by a fitness operation with a given condition set. The power control information is corresponding to an optimized mesopic luminance after the fitness operation. The given condition set is composed by referencing to a mesopic luminance parameter, a photopic luminance parameter, and a power parameter. The control unit receives the power control information to adjust the luminance of the light emitting units.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF DISCLOSED EMBODIMENTS

In embodiments of the disclosure, an illuminating apparatus with adjustable luminance is provided. The luminance is adjusted according to the mesopic property when the ambience is at the dim state. The disclosure can have the effect to save power.

Several embodiments are provided for the disclosure, but the disclosure is not just limited to the embodiments. In addition, the embodiments may also be properly combined into other embodiments.

Figure 1:
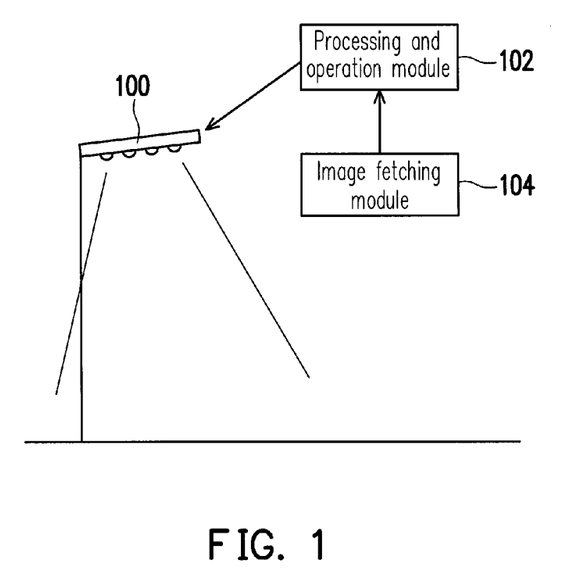
FIG. 1 is a drawing, schematically illustrating a lighting system for dim ambience, according to an embodiment of the disclosure.

FIG. 1 is a drawing, schematically illustrating a lighting system for dim ambience, according to an embodiment of the disclosure. Referring to FIG. 1, the lighting system for dim ambience can include a light source module 100, a processing and operation module 102, an image capturing module 104 and a control unit (not shown in drawing). The spectrum of the light source module 100 is variable under control by the control unit. The processing and operation module 102 produces a required luminance to be output by the light source module 100 under the mesopic state by an operation with a fitness function according to an image capturing from the ambience by the image capturing module 104. After then, the control unit can control the light emitting intensity for all the colors of the light emitting units of the light source module 100.

The modules can approach to about the same luminance values (cd/m$^2$) between the situation for the eye sensing under the dim ambience and the situation for the eye sensing under the usual bright ambience. At the same time, the lighting system for dim ambience can also save the power in the dim ambience.

Figure 2:
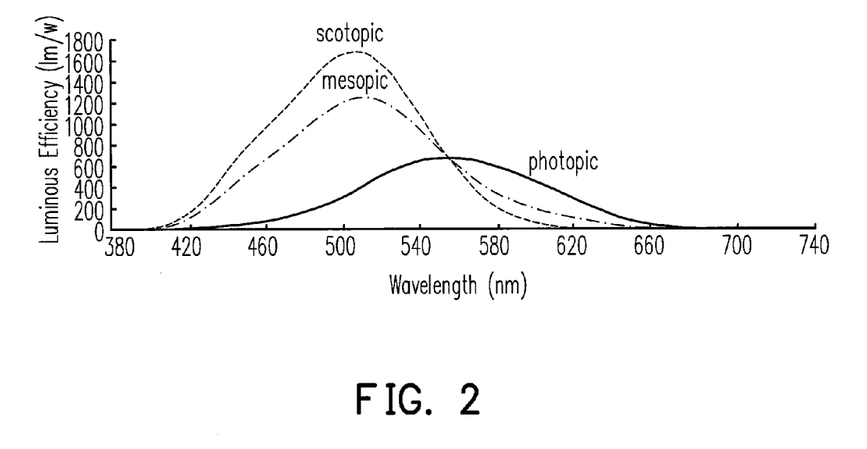
FIG. 2 is a drawing, schematically illustrating the visual efficacy curves with respect to wavelength for photopic luminance, mesopic luminance and scotopic luminance.

FIG. 2 is a drawing, schematically illustrating the visual efficacy curves with respect to wavelength for photopic luminance (P), mesopic luminance and scotopic luminance (S). Referring to FIG. 2, the photoreceptor cells at different visual states would have different responses. For example for the light with wavelength of 505 nm, it would have higher luminance efficacy at the scotopic state. The visual efficacy curve of the mesopic state is between the photopic state and the scotopic state, having the dynamically varying property and changing with the background luminance of the ambience. Therefore, in the dim ambience, if the spectrum and the power parameter generated by the light source module can dynamically change in accordance with visual efficacy curve of the mesopic state, the illuminating effect can be improved and the illumination efficiency is improved, resulting in reducing the energy consumption.

An embodiment of the disclosure provides a luminance detecting unit, capable of detecting the mesopic luminance. The luminance detecting unit, for example is the image capturing module 104, capturing the image based on the detecting mechanism.

The mesopic luminance function (L) in theoretical form can be expressed by Equation (1):

$$L = P \left\{ 0.834 - 0.335\left(\frac{S}{P}\right) - 0.2\left(\frac{1}{P}\right) + \sqrt{\begin{array}{c} 0.696 - 0.333\left(\frac{1}{P}\right) - 0.56\left(\frac{S}{P}\right) + \\ 0.113\left(\frac{S}{P}\right)^2 + 0.537\left(\frac{S}{P}\right)\left(\frac{1}{P}\right) + 0.04\left(\frac{1}{P}\right)^2 \end{array}} \right\} \quad (1)$$

where the luminance ratio (S/P) is a ratio of the scotopic luminance (S) to the photopic luminance (P).

The mesopic luminance function (L) has been simplified into twp parameters as S/P value and the P value. In this manner, the software operation or the operation circuit of hardware can be simplified. According to the mesopic luminance function (L), the values of S/P and P are the values needed to be measured.

Figure 3:
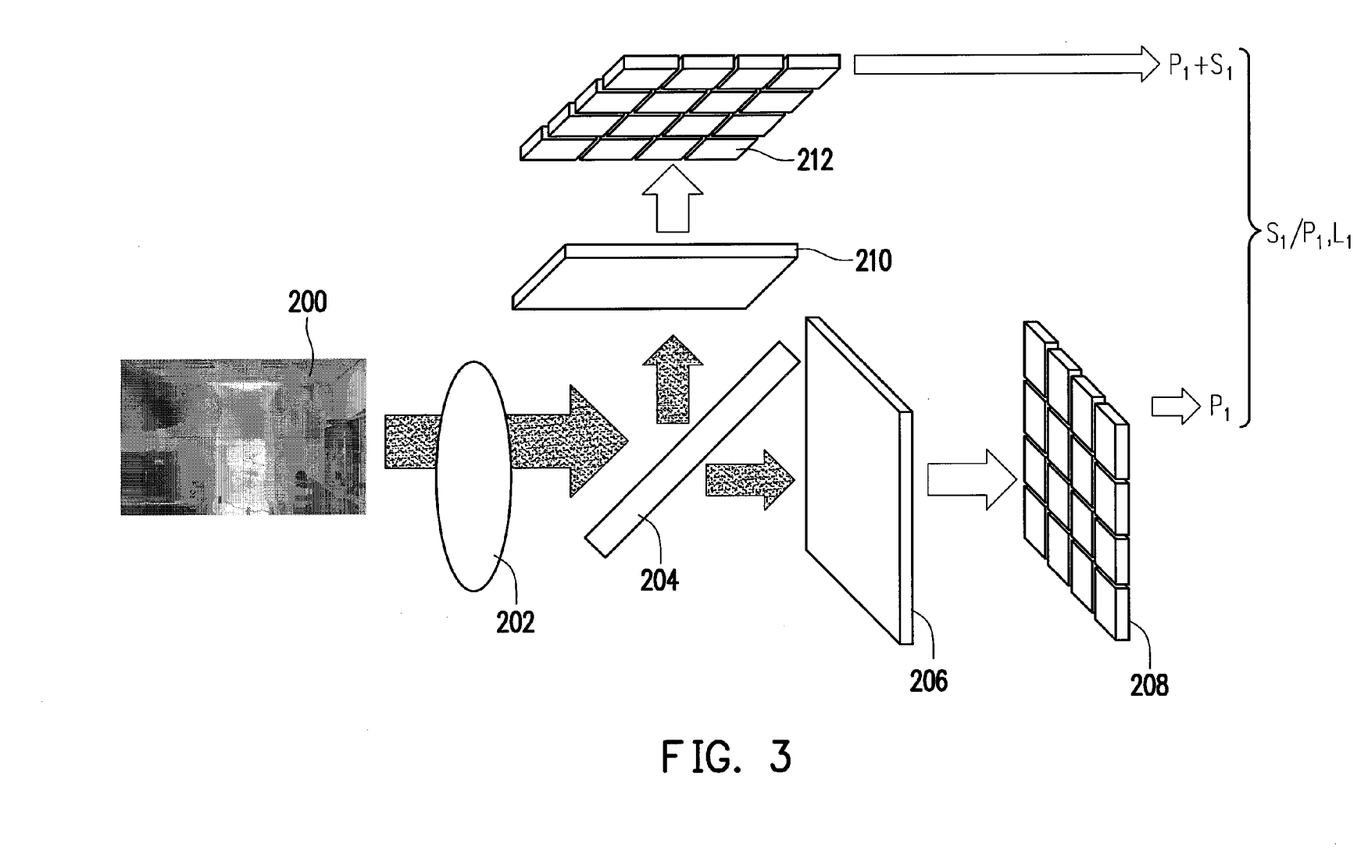
FIG. 3 is a drawing, schematically illustrating a structure of luminance detecting unit, according to an embodiment of the disclosure.

FIG. 3 is a drawing, schematically illustrating a structure of luminance detecting unit, according to an embodiment of the disclosure. Referring to FIG. 3, the luminance detecting unit in an embodiment comprises an imaging system 202, which captures an ambient image from the illuminated ambience 200. An optical splitter 204 splits the ambient image into a first image and a second image. A photopic filter plate 206 receives and filters the first image. A first detecting array 208 receives the filtered first image and obtains a photopic luminance, expressed as P1. A photopic/scotopic mixed filter plate 210 receives and filters the second image. A second detecting array 212 receives the filtered second image and obtains a mixed luminance, which is a summation of the photopic luminance (P1) and the scotopic luminance (S1), expressed as P1+S1. Since the mesopic luminance function (L) in Equation (1) needs the two parameters, that are P1 and S1/P1, the measured valued of P1+S1 needs to be divided by P1 and then subtracted by 1, to obtain the S1/P1 value. In the embodiment, the S1/P1 value is not obtained by measuring the scotopic luminance (S1). Thus, the mesopic luminance can be directly calculated according to the Equation (1).

Figure 4:
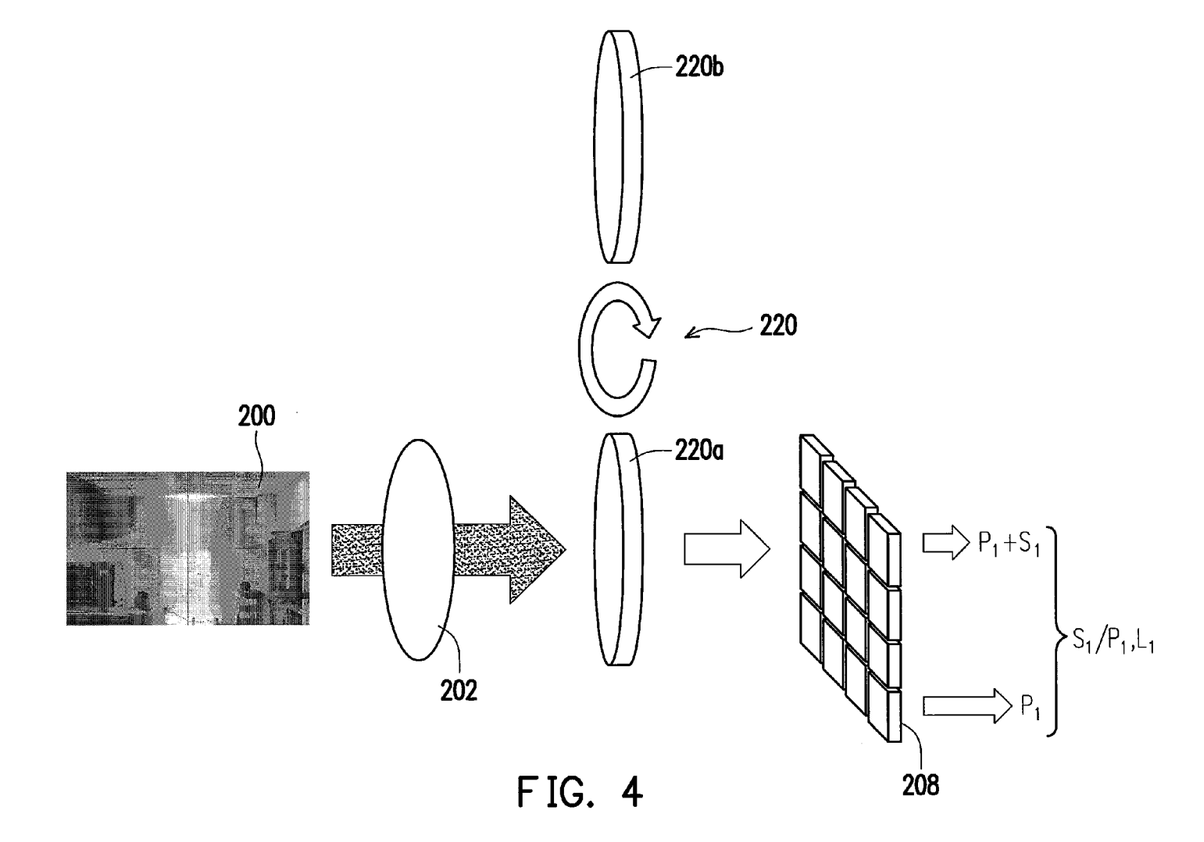
FIG. 4 is a drawing, schematically illustrating a structure of luminance detecting unit, according to an embodiment of the disclosure.

FIG. 4 is a drawing, schematically illustrating a structure of luminance detecting unit, according to an embodiment of the disclosure. Referring to FIG. 4, the luminance detecting unit in an embodiment as an example comprises an imaging system 202, which captures an ambient image from the illuminated ambience 200. A switchable filter set 220 can be switched to a photopic filter plate 220a or a photopic/scotopic mixed filter plate 220b to receive and filter the ambient image and outputs a first image and a second image respectively. The structure of the switchable filter set 220 can be a rotating disk structure, for example, to rotate the photopic filter plate 220a or the photopic/scotopic mixed filter plate 220b to the detecting optical path. A detecting array 208 respectively receives the filtered first image and the filtered second image, to obtain the photopic luminance (P1) and the mixed luminance (P1+S1), which is a summation of the photopic luminance (P1) and the scotopic luminance (S1). As previously described, after the measured value of P1+S1 is divided by P1 and subtracted by 1, the S1/P1 value is obtained. Thus, the mesopic luminance can be calculated from Equation (1).

Figure 5:
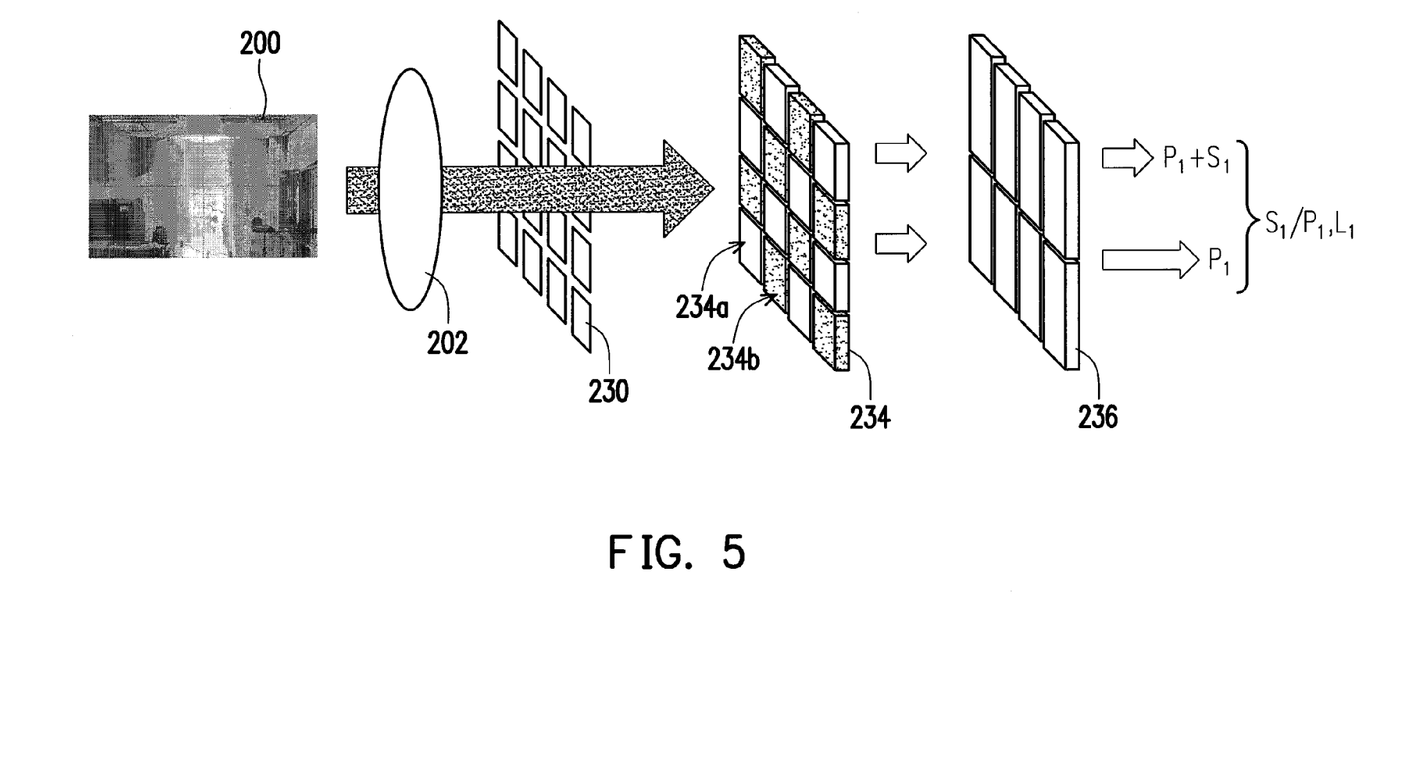
FIG. 5 is a drawing, schematically illustrating a structure of luminance detecting unit, according to an embodiment of the disclosure.

In addition, a luminance detecting unit in another embodiment has been proposed. FIG. 5 is a drawing, schematically illustrating a structure of luminance detecting unit, according to an embodiment of the disclosure. Referring to FIG. 5, the luminance detecting unit comprises an imaging system 202, which captures an ambient image from the illuminated ambience 200. A liquid crystal (LC) switch 230 receives the ambient image. The LC switch 230 has multiple LC switching regions, each LC switching region can be switched between two states of a transparent state and an opaque state. The LC switching regions are divided into two groups. In accordance with the subsequence configuration of the pixel filter plate 234, the LC switch 230 is under switching control at different time, and then the two groups of the LC switching regions respectively shield the ambient image to respectively output a first image and a second image.

The pixel filter plate 234 is a filtering pixel array, composed of a uniform mix of multiple photopic filtering pixels 234a and multiple photopic/scotopic mixed filtering pixels 234b. For example, the white regions in drawing represent the photopic filtering pixels 234a and the dotted regions represent the photopic/scotopic mixed filtering pixels 234b. The LC switching regions of the LC switch 230 correspond to the filtering pixel array to cause the photopic filtering pixels and the photopic/scotopic mixed filtering pixels to alternatively receive the first image and the second image. A detecting array 236 respectively receives the filtered first image and the filtered second image at different time to obtain a photopic luminance (P1) and a mixed luminance (P1+S1), which is the summation of photopic luminance and scotopic luminance. As in foregoing descriptions, the quantity of P1+S1 is divided by P1 and then subtracted by 1 to obtain the quantity of S1/P1. Thus, the mesopic luminance can be calculated from Equation (1).

Figure 6:
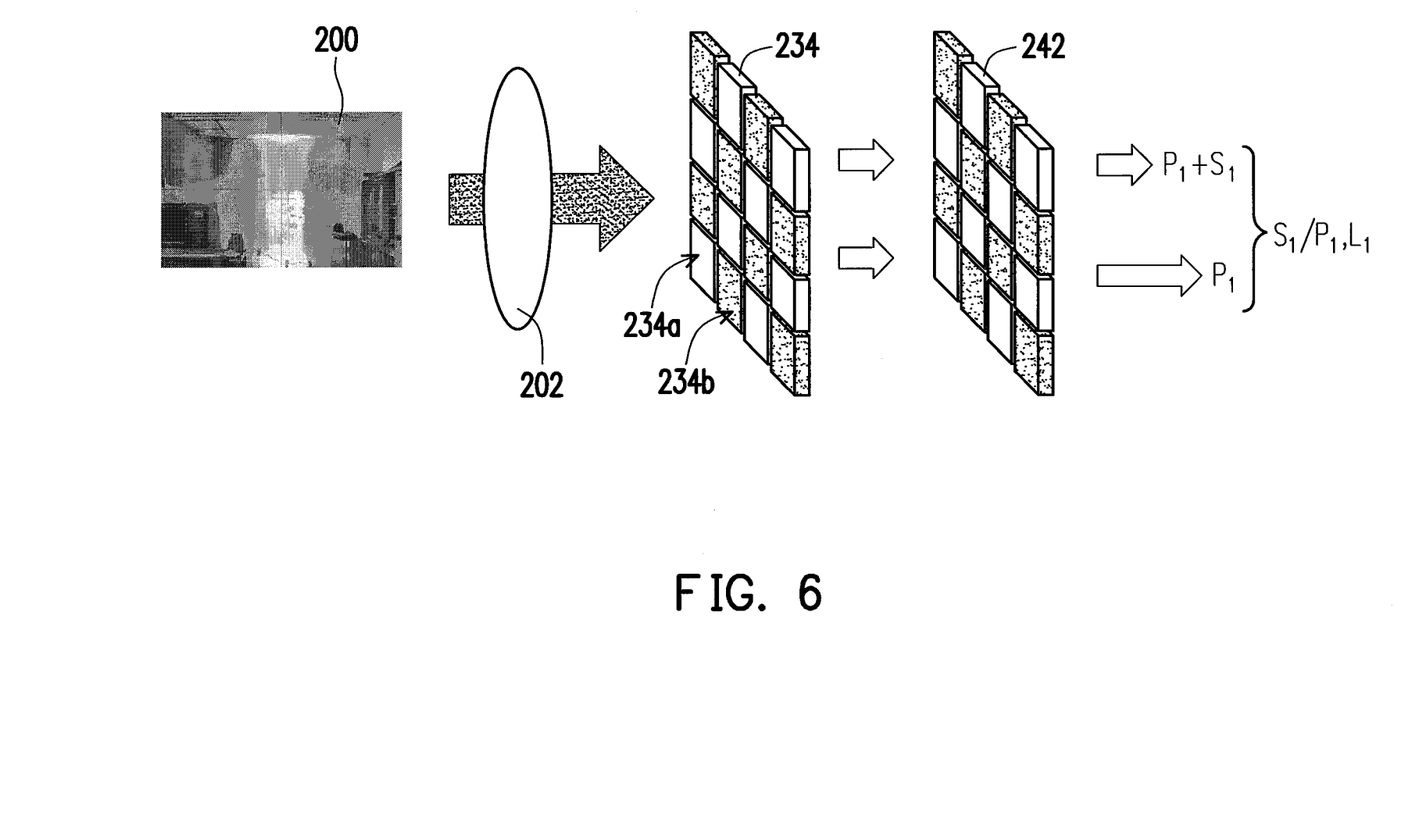
FIG. 6 is a drawing, schematically illustrating a structure of luminance detecting unit, according to an embodiment of the disclosure.

Furthermore, a luminance detecting unit in another embodiment has been proposed. FIG. 6 is a drawing, schematically illustrating a structure of luminance detecting unit, according to an embodiment of the disclosure. Referring to FIG. 6, the luminance detecting unit in an embodiment comprises an imaging system 202, which captures an ambient image from the illuminated ambience 200. A pixel filter plate 234 receives the filtered ambient image. As previously described, the structure of the pixel filter plate 234 is a filtering pixel array, composed of a uniform mix of multiple photopic filtering pixels 234a and multiple photopic/scotopic mixed filtering pixels 234b. The pixel filter plate 234 simultaneously filters the ambient image to respectively output a first image and a second image. A detecting array 242 also simultaneously receives the filtered first image and the filtered second image to obtain a photopic luminance (P1) and a mixed luminance (P1+S1), which is the summation of photopic luminance and scotopic luminance. By the same foregoing manner, the mesopic luminance can be calculated.

In this embodiment, the detecting pixels of the detecting array 242 also correspond to the pixels of the pixel filter plate 234 and divided into two groups. The two kinds of filter plate are exposed, simultaneously, and the need of exposing time can be reduced. In addition, each of the filtering regions respectively corresponds to one pixel.

In the foregoing embodiments, the quantity of P1 and P1+S1 are measured. After the simple operation, the ratio of S1/P1 can be obtained. However, the ratio of S1/P1 can also be directly measured.

Figure 7:
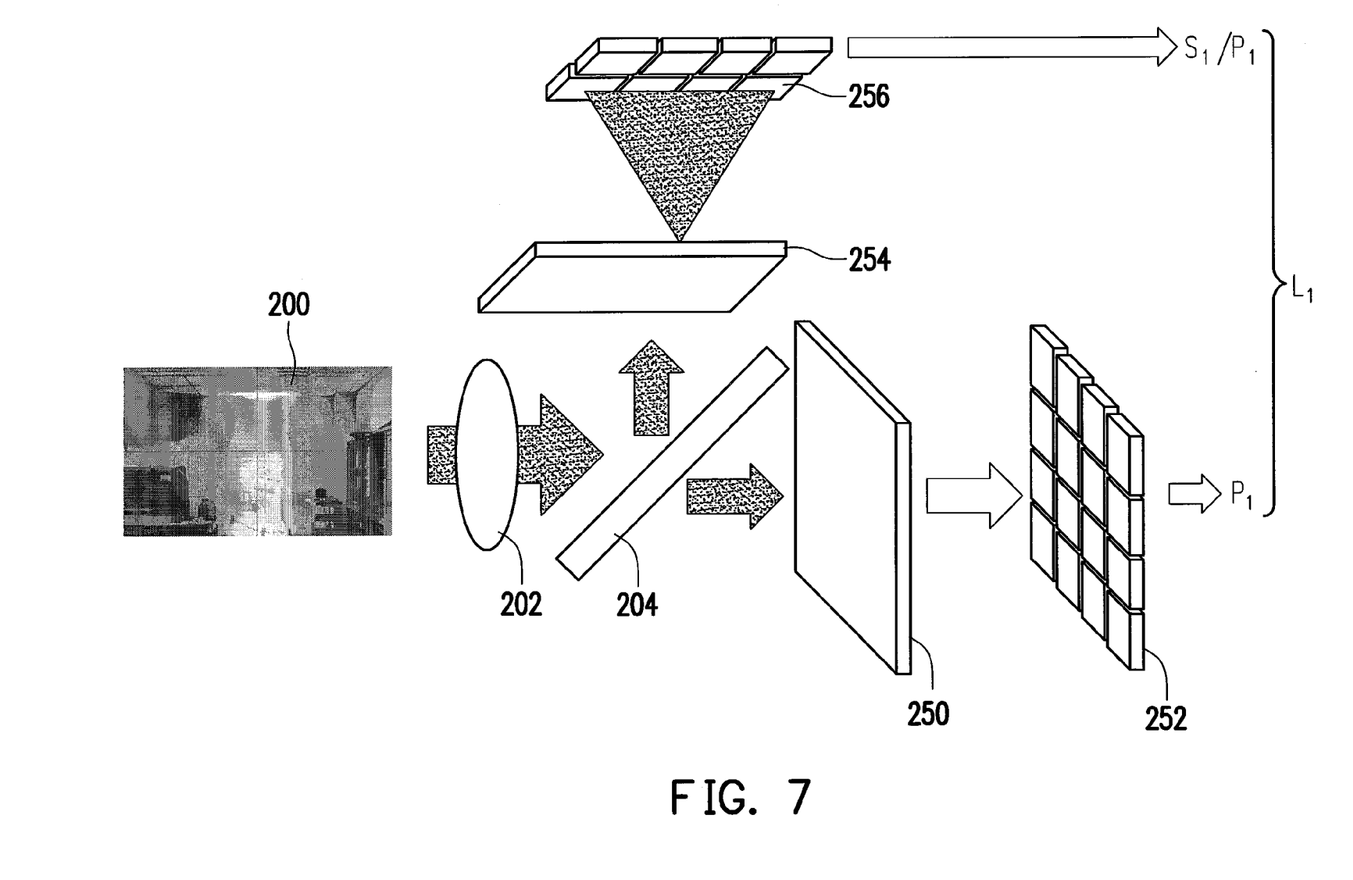
FIG. 7 is a drawing, schematically illustrating a structure of luminance detecting unit, according to an embodiment of the disclosure.

FIG. 7 is a drawing, schematically illustrating a structure of luminance detecting unit, according to an embodiment of the disclosure. Referring to FIG. 7, the luminance detecting unit in an embodiment comprises an imaging system 202, which captures an ambient image from the illuminated ambience 200. An optical splitter 204 splits the ambience image into a first image and a second image. A photopic filter plate 250 receives and filters the first image. A detecting array 252 receives the filtered first image and obtains a photopic luminance (P1). A spectrometer unit 254 receives the second image to produce a spectrum. The spectrum detecting array 256 receives the spectrum to directly obtain the S1/P1 ratio. Thus, the mesopic luminance can be calculated according to Equation (1).

In the embodiment, the S1/P1 ratio is measured by the spectrometer of the system. However, in another embodiment, the S1/P1 ratio can also be obtained without actual measurement if the spectrum of the light source apparatus is measured beforehand and then is the already known data. In this situation, the optical splitter 204, the spectrometer unit 254, and the spectrum detecting array 256 in FIG. 7 can be omitted. It just needs the photopic filter plate 250 and the detecting array 252 to directly measure the photopic luminance (P1). The S1/P1 ratio can be obtained by calculating from the external light-source information.

Figure 8:
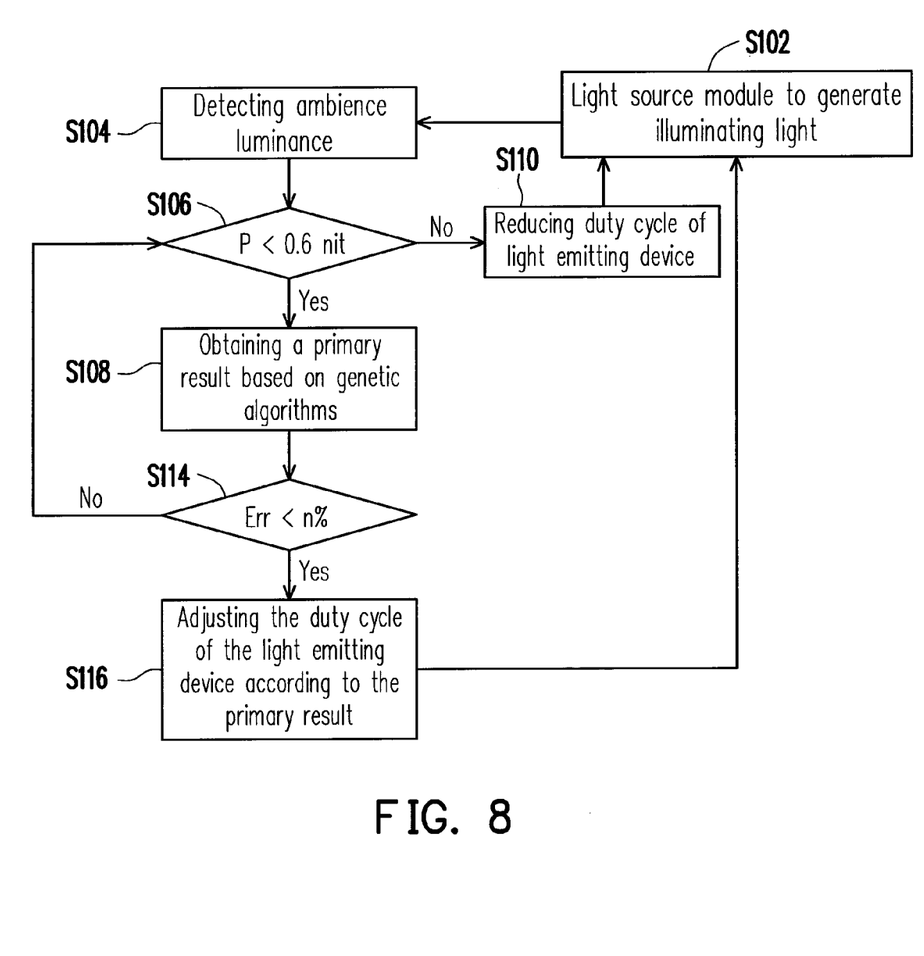
FIG. 8 is a drawing, schematically illustrating an operation flow of the lighting system for dim ambience, according to an embodiment of the disclosure.

The operation of the system and the fitting procedure are to be described. FIG. 8 is a drawing, schematically illustrating an operation flow of the lighting system for dim ambience, according to an embodiment of the disclosure. Referring to FIG. 8, in step S102, when the light source module is activated, an illuminating light is produced. The illuminating light is mixed into the ambient light. In step S104, the ambient light is detected. An image capturing module can be used in an example, to detect the light intensity of a specific ambience from the ambient light involving at least one light source module therein. The detected quantity is transmitted to the processing and operation module. In step S106, the processing and operation module can judge whether or not the ambient light is satisfying the condition of luminance (P)$\geq$0.6 nit. When it is at the situation of P$\geq$0.6 nit, it is treated as at the photopic state. When it is at the situation of P<0.6 nit, it is treated as at the mesopic state. If the system is at the photopic state, the step S110 is performed. For example, the system is not necessary to provide the illuminating light or provide with reduced luminance, such as reducing the duty cycle of the light emitting units or completely turning off. This also means that the duty cycle is adjusted to zero. Returning back to the step S102, the control unit is used to adjust the light source module, accordingly.

However, when the system is at the mesopic state, as foregoing descriptions, the actual visual sensitivity of luminance is different from the ambience at photopic state, then the output light of the light source module is necessary to be adjusted to adapt the dim ambience, in which the luminance is changed often. For example, the adjusted luminance should satisfy the pre-defined luminance (P0), which may be the standard luminance or the luminance personally needed by user.

When the system is at the dim ambience, the step S108 is performed, in which the processing and operation module uses the concept of GA fitness mechanism to treat each detected light source module as a gene. By going through the procedure of selection, crossover and mutation, a primary result can be obtained. The fitting condition for the GA fitness would be described later. In step S114, a error constant n % for the error (Err) of the primary result has been set according to the actual requirement. If the error is less than n %, then the primary result can be considered as a first optimized solution or a secondary optimized solution, and then the process goes to step S116. In step S116, it uses the primary result to adjust the duty cycle of the light emitting unit. If the error of the primary result is greater than or equal to the error constant, the operation goes back to the step S106 for iteration, continuously generate a next new primary result.

In step S108, the judging condition set used in GA fitness for the processing and operation module takes to obtain the primary result can have several settings.

In an embodiment, the judging condition set includes three conditions:
1. an absolute difference between the mesopic luminance (L) and the pre-defined luminance (P0) is minimum;
2. the power corresponding to the mesopic luminance (L) is less than the power corresponding to the pre-defined luminance (P0); and
3. photopic luminance (P)<0.6 cd/m2.

According to the mesopic luminance L and photopic luminance P being measured, based on the least square calculation corresponding to the requirement of minimum absolute difference. The mesopic luminance L can approach to the required standard luminance or the pre-defined luminance (P0) with zero or about zero difference. This is to let the sensing luminance of human eye in the dim ambience which the luminance is often-changing can still approach to about the same luminance as the standard luminance or the pre-defined luminance (P0) as required by the user under the photopic state. In addition, the system also satisfies the condition for saving power. The number of light source modules for outputting the light to the specific ambience is m, as an example. The total power consumption, Power(L), needs to be less than the power consumption of Power(P0). Changing the point of view for this consideration to the duty cycle (D), the duty cycle is shorter, the power consumption is less. Thus, the total duty cycle $\Sigma D_m$ for the involved m unit of light source modules is less than the total duty cycle $\Sigma D_{P_0}m$, under the standard requirement or the personal requirement. The above three judging conditions used to look for the primary result with the best solution or the secondary best solution in the GA fitness should be satisfied at the same time, and then it enters the step S114 to compare the error constant.

After the judging conditions of the GA fitness is set, by the GA fitness operation and the comparison with the error constant, the pulse width modulation (PWM) for the duty cycle with the solution can be D1, D2, D3, . . . etc. is obtained. In step S116, the duty cycle of the light emitting units is adjusted according to the primary result. After then, it goes back to the step S102, the output of the light source modules is adjusted by the control unit according to the adjusted duty cycle. The system may repeatedly detect the ambient light by the image capturing module. The ambient light has been mixed with the light having the intensity of the adjusted light emitting units. The foregoing steps are repeated under the often-changing dim ambience, particularly to the ambient light, which may change to strong level or weak level from the ambience and then affect the visual efficacy curve. The output light of the light source modules can be dynamically adjusted, to maintain the visual efficacy curve satisfying the standard level or the personal defined level, and the power can also be saved.

In another embodiment, the judging condition set in step S108 includes three conditions:
1. maximum of [L-P];
2. the difference of [Power(L)-Power (P0)] is minimum; and
3. photopic luminance (P)<0.6 cd/m2.

In another embodiment, the judging condition set in step S108 includes three conditions:
1. maximum of [L-P];
2. minimum of Power(L); and
3. photopic luminance (P)<0.6 cd/m2.

In other words, the judging condition set can not only satisfy the better state for the visual sensitivity but also satisfy the power saving. The judging condition can be set according to the actual need. Also and, the threshold of the photopic luminance is not limited to 0.6 cd/m2.

Figure 9:
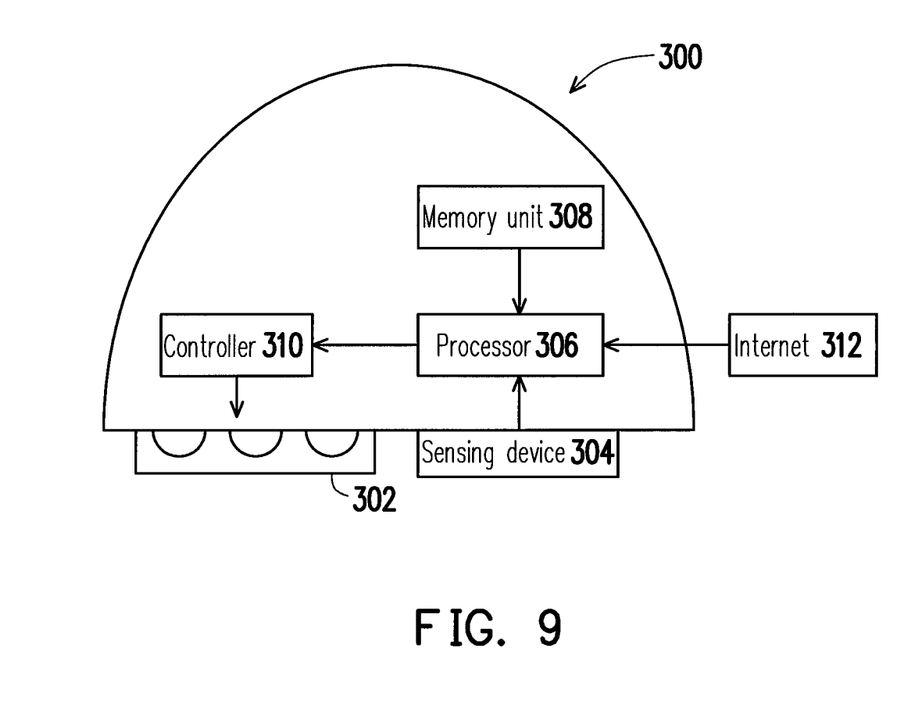
FIG. 9 is a drawing, schematically illustrating lighting system for dim ambience, according to an embodiment of the disclosure.

For the whole system, it can be integrated in an apparatus. FIG. 9 is a drawing, schematically illustrating lighting system for dim ambience, according to an embodiment of the disclosure. Referring to FIG. 9, the lighting apparatus 300 for dim ambience includes at least one light source module 302. The light source module 302 may have multiple light emitting units with different colors, such as the light emitting diode (LED) with different wavelengths, so as to mix for white light. The sensing unit 304, such as the luminance detecting unit, is used to detect the ambient light, which includes the illuminating light from the light source module 302. The detected data is output to the processor 306, such as the processing and operation module, to perform the GA fitness procedure under the judging condition set. The processor 306 can reference to the information stored in the memory unit 308 or obtains the information from the internet 312 to perform the GA fitness procedure. After the optimized power control information is obtained, it is output to the controller 310 to adjust light intensity of the light emitting units of the light source module 302.

In an embodiment of the disclosure, a modulation method for the illumination light under the dim ambience is also disclosed. The method uses the S/P ratio to modulate the light emitting units of the light source module in different colors, such as R, G, and B, so that a better illuminating efficiency under the mesopic state can be obtained. Not only maintain the illuminating efficiency, also the power can be saved.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A lighting system for dim ambience, comprising:
at least a light source module, implemented in the ambience to provide illumination, wherein each of the light source module has a plurality of light emitting units, each of the light emitting units is respectively controlled to produce a luminance;
a luminance detecting unit, detecting a photopic luminance and a luminance ratio of the ambience, wherein the luminance ratio is defined as a ratio of a scotopic luminance to the photopic luminance;
a processing and operation module, calculating out a mesopic luminance according to the photopic luminance and the luminance ratio, wherein when the photopic luminance is less than a dim-light setting value, a power control information is obtained by a fitness operation with a selected condition set, wherein the power control information is an optimized mesopic luminance after the fitness operation, wherein the selected condition set includes a mesopic luminance parameter, a photopic luminance parameter, and a power parameter being referenced; and
a control unit, receiving the power control infoiniation to adjust the luminance of each of the light emitting units.

2. The lighting system for dim ambience of claim 1, wherein the fitness operation is a genetic algorithm fitness.

3. The lighting system for dim ambience of claim 1, wherein the luminance detecting unit directly detects the luminance ratio (S/P) and the photopic luminance (P), and the mesopic luminance (L) is calculated by a mesopic luminance function:

$$L = P \left\{ 0.834 - 0.335\left(\frac{S}{P}\right) - 0.2\left(\frac{1}{P}\right) + \sqrt{\begin{array}{c} 0.696 - 0.333\left(\frac{1}{P}\right) - 0.56\left(\frac{S}{P}\right) + \\ 0.113\left(\frac{S}{P}\right)^2 + 0.537\left(\frac{S}{P}\right)\left(\frac{1}{P}\right) + 0.04\left(\frac{1}{P}\right)^2 \end{array}} \right\}.$$

4. The lighting system for dim ambience of claim 1, wherein the luminance detecting unit comprises:
an imaging system, capturing an ambient image;

an optical splitter, splitting the ambient image into a first image and a second image;
a photopic filter plate, receiving and filtering the first image;
a first detecting array, receiving the filtered first image to obtain the photopic luminance;
a photopic/scotopic mixed filter plate, receiving and filtering the second image; and
a second detecting array, receiving the filtered second image to obtain a mixed luminance, the mixed luminance being a summation of the photopic luminance and the scotopic luminance.

5. The lighting system for dim ambience of claim 1, wherein the luminance detecting unit comprises:
an imaging system, capturing an ambient image;
a switchable filter set, capable of being switched to a photopic filter plate or a photopic/scotopic mixed filter plate to receive and filter the ambient image and output a first image and a second image respectively;
a detecting array, respectively receiving the filtered first image and the filtered second image, to obtain the photopic luminance and a mixed luminance, the mixed luminance being a summation of the photopic luminance and the scotopic luminance.

6. The lighting system for dim ambience of claim 1, wherein the luminance detecting unit comprises:
an imaging system, capturing an ambient image;
a liquid crystal (LC) switch, receiving the ambient image, wherein the LC switch has multiple LC switching regions, each of the LC switching regions can be switched between two states of a transparent state and an opaque state, wherein the LC switch are under switching controlled to respectively output a first image and a second image at different time;
a pixel filter plate, as a filtering pixel array composed of a uniform mix of multiple photopic filtering pixels and multiple photopic/scotopic mixed filtering pixels, wherein the LC switching regions correspond to the filtering pixel array to cause photopic filtering pixels and photopic/scotopic mixed filtering pixels to alternatively receive the first image and the second image; and
a detecting array, respectively receiving the filtered first image and the filtered second image at different time to obtain the photopic luminance and a mixed luminance, the mixed luminance being a summation of the photopic luminance and the scotopic luminance.

7. The lighting system for dim ambience of claim 1, wherein the luminance detecting unit comprises:
an imaging system, capturing an ambient image;
a pixel filter plate, receiving and filtering the ambient image, wherein the pixel filter plate is a filtering pixel array composed of a uniform mix of multiple photopic filtering pixels and multiple photopic/scotopic mixed filtering pixels to simultaneously filter the ambient image to respectively output a first image and a second image; and
a detecting array, simultaneously receiving the filtered first image and the filtered second image to obtain the photopic luminance and a mixed luminance, the mixed luminance is a summation of the photopic luminance and the scotopic luminance.

8. The lighting system for dim ambience of claim 1, wherein the luminance detecting unit comprises:
an imaging system, capturing an ambient image;
an optical splitter, splitting the ambient image into a first image and a second image;
a photopic filter plate, receiving and filtering the first image;
a detecting array, receiving the filtered first image and obtaining the photopic luminance;
a spectrometer unit, receiving the second image to produce a spectrum; and
a spectrum detecting array, receiving the spectrum to directly obtain the luminance ratio.

9. The lighting system for dim ambience of claim 1, wherein the dim-light setting value is $0.6\ cd/m^2$.

10. The lighting system for dim ambience of claim 1, wherein the selected condition set comprises:
a minimum of a absolute difference between a candidate mesopic luminance (L2) and a reference photopic luminance (P0);
a needed power corresponding to L2 is less than the needed power corresponding to P0; and
a detected photopic luminance $(P)<0.6\ cd/m^2$.

11. The lighting system for dim ambience of claim 1, wherein the selected condition set comprises:
a maximum of a candidate mesopic luminance subtract a detected photopic luminance (L2-P);
a minimum difference between a needed power corresponding to L2 and the needed power corresponding to P; and $P<0.6\ cd/m^2.$ 12. The lighting system for dim ambience of claim 1, wherein the selected condition set comprises:
a maximum of a candidate mesopic luminance subtract a detected photopic luminance (L2-P);
a minimum of a needed power corresponding to L2; and $P<0.6\ cd/m^2.$ 13. The lighting system for dim ambience of claim 1, wherein when the fitness operation produce a primary result, if a error of the primary result is greater than a setting error constant, then the fitness operation is iterated.

14. A lighting system for dim ambience, comprising:
at least one light source module, implemented in the ambience to provide illumination, wherein each of the light source module has a plurality of light emitting units, each of the light emitting units is respectively controlled to generate a luminance;
a luminance detecting unit, detecting a photopic luminance;
a processing and operation unit, externally receiving a light source information of the light source module to calculate out a luminance ratio (S/P), which is defined by a ratio of a scotopic luminance (S) to the photopic luminance (P), a mesopic luminance is calculated out according to the photopic luminance and the luminance ratio, when the photopic luminance is less than a dim-light setting value, a power control information is obtained by a fitness operation with a given condition set, wherein the power control information is corresponding to an optimized mesopic luminance after the fitness operation, wherein the given condition set composed by referencing to a mesopic luminance parameter, a photopic luminance parameter, and a power parameter; and a control unit, receiving the power control information to adjust the luminance of the light emitting units.

15. The lighting system for dim ambience of claim 14, wherein the luminance detecting unit comprises:
an imaging system, capturing an ambient image;
a photopic filter plate, receiving and filtering the ambient image; and a detecting array, receiving the filtered ambient image and obtaining the photopic luminance.

16. The lighting system for dim ambience of claim 14, wherein the fitness operation is a genetic algorithm fitness.

17. The lighting system for dim ambience of claim 14, wherein the mesopic luminance (L) is calculated by a mesopic luminance function according to the luminance ratio (S/P) and the photopic luminance (P):

$$L = P \left\{ 0.834 - 0.335\left(\frac{S}{P}\right) - 0.2\left(\frac{1}{P}\right) + \sqrt{\begin{array}{c} 0.696 - 0.333\left(\frac{1}{P}\right) - 0.56\left(\frac{S}{P}\right) + \\ 0.113\left(\frac{S}{P}\right)^2 + 0.537\left(\frac{S}{P}\right)\left(\frac{1}{P}\right) + 0.04\left(\frac{1}{P}\right)^2 \end{array}} \right\}.$$

18. The lighting system for dim ambience of claim 14, wherein the dim-light setting value is $0.6 \ cd/m^2$.

* * * * *